US006415083B1

(12) United States Patent
Anderson et al.

(10) Patent No.: US 6,415,083 B1
(45) Date of Patent: Jul. 2, 2002

(54) TRAVELING WAVE ELECTRO-OPTIC MODULATOR BASED ON AN ORGANIC ELECTRO-OPTIC CRYSTAL

(75) Inventors: William Anderson, Half Moon Bay; Timothy E. Van Eck, Los Altos, both of CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/804,399

(22) Filed: Mar. 13, 2001

(51) Int. Cl.$^7$ ................................................ G02B 6/26
(52) U.S. Cl. ............................... 385/40; 385/1; 385/2; 385/39; 385/14; 385/129; 385/130; 385/143
(58) Field of Search .......................... 385/1, 2, 3, 39, 385/40, 143, 145, 131, 14, 129, 130

(56) References Cited

U.S. PATENT DOCUMENTS

| | | | | |
|---|---|---|---|---|
| 3,909,108 A | * | 9/1975 | Taylor .................... | 385/40 X |
| 4,772,084 A | * | 9/1988 | Bogert .................... | 385/40 X |
| 4,850,667 A | * | 7/1989 | Djupsjobacka ............ | 385/2 |
| 5,359,680 A | * | 10/1994 | Riviere .................. | 385/9 |
| 5,416,858 A | * | 5/1995 | Riviere .................. | 385/1 |
| 5,455,876 A | * | 10/1995 | Hopfer et al. ........... | 385/2 |
| 5,763,289 A | * | 6/1998 | Kim et al. ............... | 385/2 X |
| 5,892,857 A | | 4/1999 | McCallion ............... | 385/1 |
| 5,982,961 A | | 11/1999 | Pan et al. ............... | 385/30 |

OTHER PUBLICATIONS

T.E. Van Eck, A.J. Ticknor, R.S. Lytel and G.F. Lipscomb, "Complementary optical tap fabricated in an electro–optic polymer waveguide", Applied Physics Letters 58 (15), Apr. 15, 1991, pp. 1588–1590.

* cited by examiner

*Primary Examiner*—Brian Healy
(74) *Attorney, Agent, or Firm*—Swidler Berlin Shereff Friedman, LLP (57) ABSTRACT

An electro-optic modulator, a system including an electro-optic modulator, and a method for producing an electro-optic modulator, which provides improved modulation sensitivity and improved environmental characteristics. The electro-optic modulator, according to the present invention, comprises: a substrate having a surface, the substrate having a first index of refraction, a first optical waveguide and a second optical waveguide, the optical waveguides formed in the substrate and being co-planar, each waveguide having a second index of refraction, each waveguide operable to transmit a light signal, a first electrode disposed on the surface of the substrate between the first and second optical waveguides, the first electrode operable to receive a modulation signal, and a second electrode and a third electrode disposed on the surface of the substrate surrounding the first and second optical waveguides, the second and third electrodes connected to a common potential, whereby the light signal is modulated in accordance with the modulation signal.

40 Claims, 6 Drawing Sheets

TRAVELING WAVE ELECTRO-OPTIC MODULATOR BASED ON AN ORGANIC ELECTRO-OPTIC CRYSTAL

FIELD OF THE INVENTION

The present invention relates to a traveling wave electro-optic modulator based on an organic electro-optic crystal

BACKGROUND OF THE INVENTION

Electro-optic modulators are useful for modulating light signals with radio frequency or higher frequency signals. Typically, electro-optic modulators are used to modulate signals onto laser light beams for use in fiber optic communications systems. It is well known to fabricate electro-optic modulators from crystals composed of $LiNbO_3$ and similar substances. Such modulators are typically constructed by ion bombardment or dopant diffusion into $LiNbO_3$ waveguides.

However, such prior art modulators are subject to problems. For example, the modulation sensitivity of $LiNbO_3$ based modulators is limited by the electro-optic coefficient of the $LiNbO_3$ material itself. One known solution to this limitation is to construct electro-optic modulator from organic polymers rather than $LiNbO_3$. However, organic polymers also have modulation sensitivity limitations due to the density of chromophores in the organic polymer material and the alignment efficiency of the chromophores by a poling process during modulator fabrication. In addition, exposure of such materials to environmental extremes may adversely affect the performance of electro-optic modulators constructed of such materials.

A need arises for an electro-optic modulator that provides improved modulation sensitivity and improved environmental characteristics.

SUMMARY OF THE INVENTION

The present invention is an electro-optic modulator, a system including an electro-optic modulator, and a method for producing an electro-optic modulator. The electro-optic modulator of the present invention provides improved modulation sensitivity and improved environmental characteristics.

An electro-optic modulator, according to the present invention, comprises: a substrate having a surface, a first optical waveguide and a second optical waveguide, the optical waveguides formed in the substrate and being co-planar, each waveguide having a first index of refraction, each waveguide operable to transmit a light signal, and the substrate having a second index of refraction, a first electrode disposed on the surface of the substrate between the first and second optical waveguides, the first electrode operable to receive a modulation signal, and a second electrode and a third electrode disposed on the surface of the substrate surrounding the first and second optical waveguides, the second and third electrodes connected to a common potential, whereby the light signal is modulated in accordance with the modulation signal.

The waveguides may be formed by any of several well-known processes, such as dopant diffusion, etching, or photobleaching. These processes typically work by lowering the index of refraction of the substrate from its original value, while leaving the index of refraction of the waveguides unchanged. The waveguides are masked during the process, which prevents exposure to the index lowering chemicals or radiation.

The second index of refraction may be lower than the first index of refraction. The optical waveguides may be formed by changing an index of refraction of the substrate from the first index of refraction to the second index of refraction by photobleaching of the substrate. The optical waveguides may be substantially aligned lengthwise with a crystalline axis of the substrate. The light signal may be a laser light signal. The substrate may be formed from a crystalline material. The substrate may be formed from diethylaminosulfur trifluoride.

An electro-optic modulator system, according to the present invention, comprises: a light source operable to output a light signal, a modulation signal generator operable to output a modulation signal, and an electro-optic modulator comprising: a substrate having a surface, a first optical waveguide and a second optical waveguide, the optical waveguides formed in the substrate and being co-planar, each waveguide having a first index of refraction, each waveguide coupled to the light signal, and the substrate having a second index of refraction, a first electrode disposed on the surface of the substrate between the first and second optical waveguides, the first electrode coupled to the modulation signal, and a second electrode and a third electrode disposed on the surface of the substrate surrounding the first and second optical waveguides, the second and third electrodes connected to a common potential, whereby the light signal is modulated in accordance with the modulation signal.

The light source may comprise a laser device. The system may further comprise an optical splitter coupled to the laser device, the optical splitter operable to output a first light signal and a second light signal, the light signals being similar. The first optical waveguide may be coupled to the first light signal and the second optical waveguide may be coupled to the second light signal. The system may further comprise an optical combiner having a first input coupled to a first modulated light signal output from the first optical waveguide, a second input coupled to a second modulated light signal output from the second optical waveguide, and an output operable to output a combined modulated light signal.

The second index of refraction may be lower than the first index of refraction. The optical waveguides may be formed by changing an index of refraction of the substrate from the first index of refraction to the second index of refraction by photobleaching of the substrate. The optical waveguides may be substantially aligned lengthwise with a crystalline axis of the substrate. The substrate may be formed from a crystalline material. The substrate may be formed from diethylaminosulfur trifluoride.

A method of producing an electro-optical modulator, according to the present invention, comprises the steps of: applying a first mask and a second mask to a substrate, the substrate having a first index of refraction, exposing the substrate and masks to light at a first angle to a perpendicular from the substrate, whereby a portion of the substrate that is not shielded by the masks is photobleached by the light so as to change an index of refraction of the portion of the substrate that is not shielded by the masks, and exposing the substrate and masks to light at a second angle to a perpendicular from the substrate, the second angle of similar magnitude to the first angle and of opposite direction to the first angle, whereby a portion of the substrate that is not shielded by the masks is photobleached by the light so as to change an index of refraction of the portion of the substrate that is not shielded by the masks.

The method may further comprise the steps of: removing the first and second masks, applying a first electrode to a surface of the substrate between the first and second optical waveguides, and applying a second electrode and a third electrode to the surface of the substrate surrounding the first and second optical waveguides. The optical waveguides may be substantially aligned lengthwise with a crystalline axis of he substrate. The substrate may be formed from a crystalline material. The substrate ay be formed from diethylaminosulfur trifluoride.

DETAILED DESCRIPTION OF THE INVENTION

Figure 1:
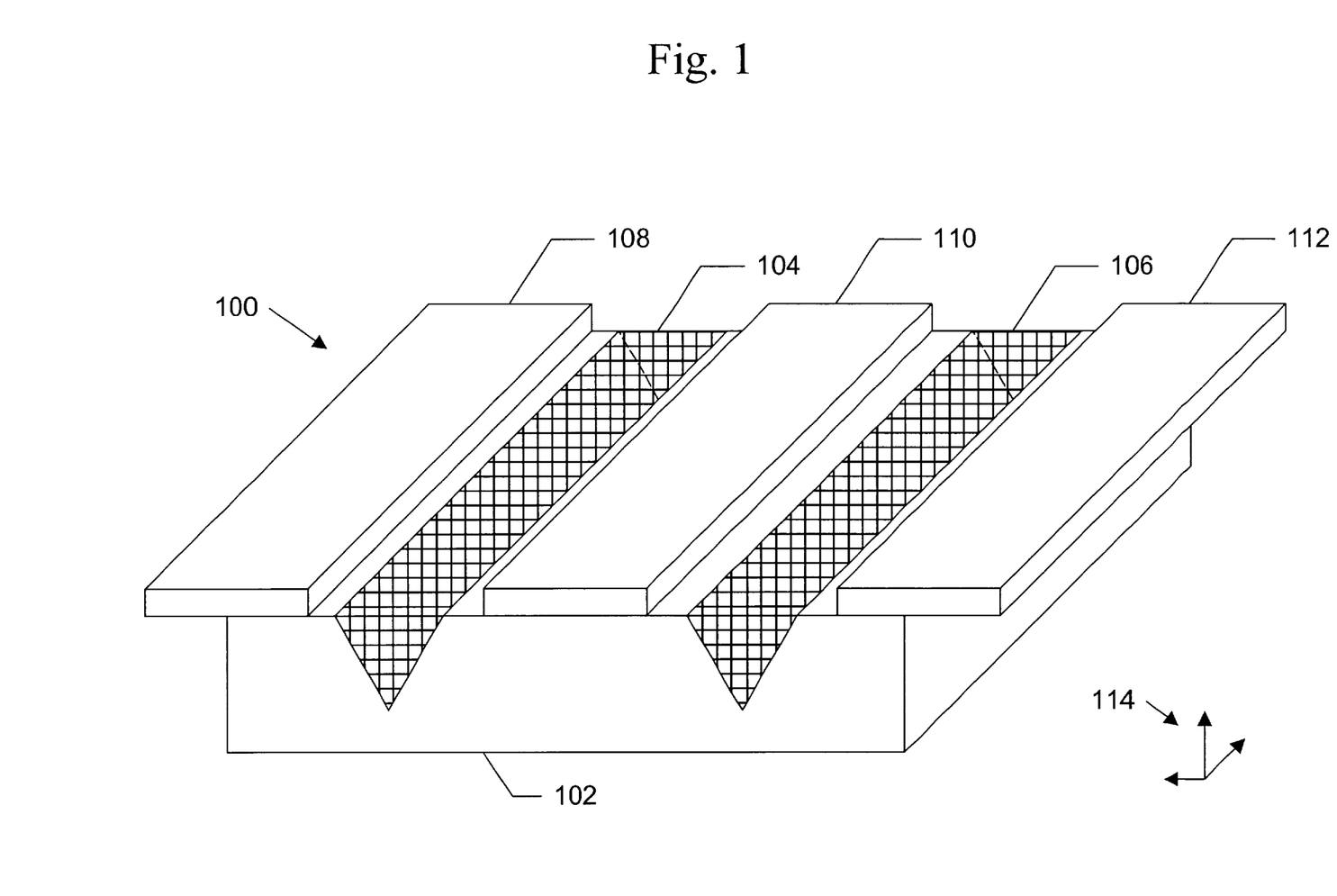
FIG. 1 is an exemplary schematic diagram of a traveling wave electro-optic modulator, according to the present invention.

A traveling wave electro-optic modulator 100, according to the present invention, is shown in FIG. 1. Modulator 100 includes substrate 102, optical waveguides 104 and 106, and electrodes 108, 110, and 112. Substrate 102 is a crystalline material, such as diethylaminosulfur trifluoride (DAST), or other crystalline material. Substrate 102 has a plurality of crystalline axes 114. Waveguides 104 and 106 are channels that are substantially optically transparent, which are formed in substrate 102. Waveguides 104 and 106 are co-planar and are substantially triangular in cross section. Each channel extends lengthwise substantially aligned with a crystalline axis 114 of substrate 102. Substrate 102 has a lower index of refraction than do waveguides 104 and 106. This condition allows light to travel through the waveguides 104 and 106 without radiating out through the substrate 102, as is well known in the relevant arts. Waveguides 104 and 106 may be formed by any of several well-known processes, such as dopant diffusion, etching, or photobleaching. These processes typically work by lowering the index of refraction of the substrate from its original value, while leaving the index of refraction of the waveguides unchanged. The waveguides are masked during the process, which prevents exposure to the index lowering chemicals or radiation.

Electrodes 108, 110, and 112 are electrically conductive elements disposed on the surface of substrate 102. Electrodes 108, 110, and 112 are co-planar with each other and are substantially parallel to waveguides 104 and 106. Electrodes 108, 110, and 112 may be any well-known electrically conductive material. Preferably, electrodes 108, 110, and 112 are a metallic material, such as aluminum, copper, gold, etc., or alloy of metals. Electrodes 108, 110, and 112 may be fabricated using any well-known deposition process, such as sputtering, etching, chemical vapor deposition, etc.

Figure 2:
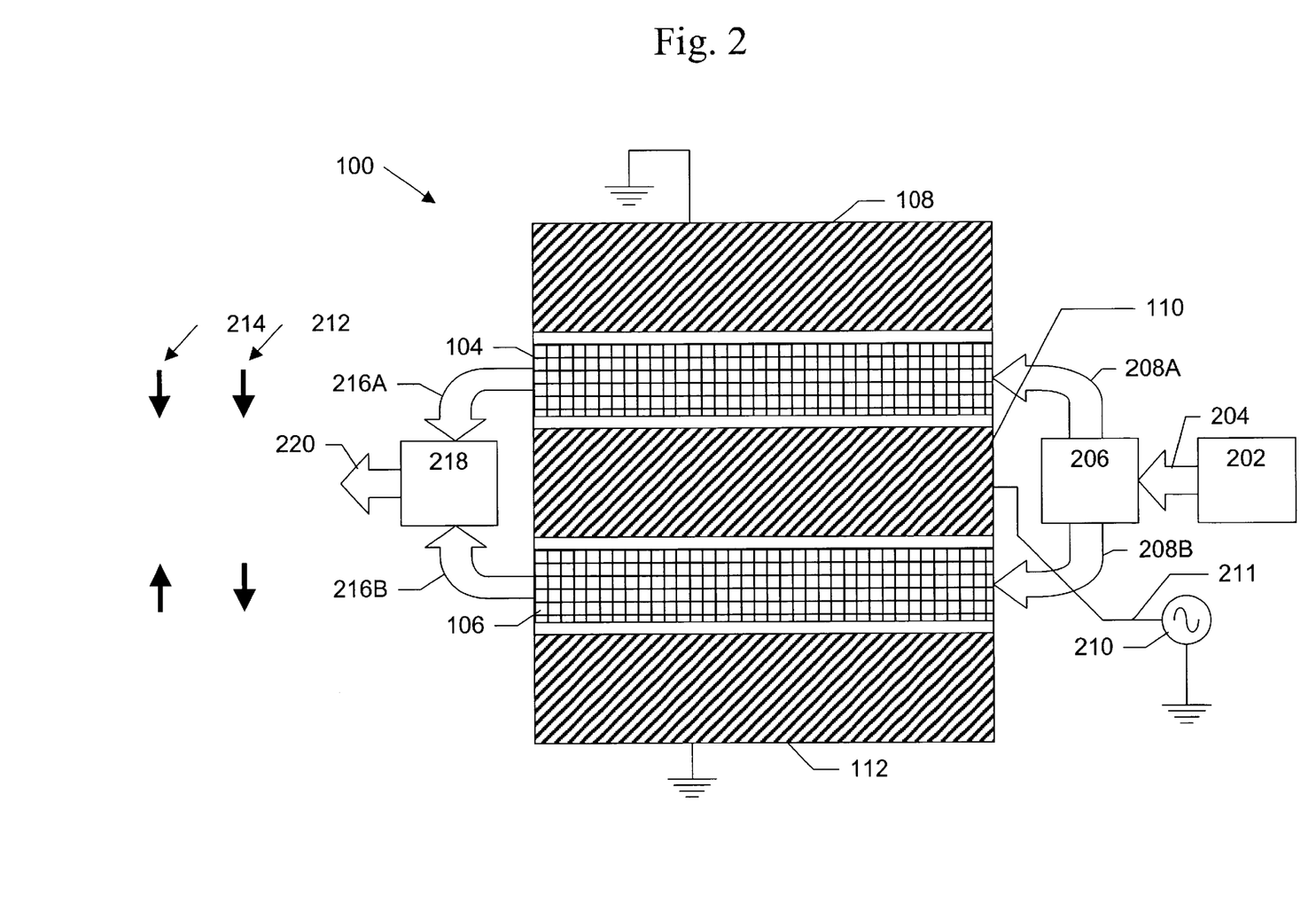
FIG. 2 is an exemplary schematic diagram of a system including the modulator shown in FIG. 1.

An exemplary schematic diagram of a system including modulator 100, shown in FIG. 1, is shown in FIG. 2. As shown in FIG. 1, Modulator 100 includes substrate 102 (not shown in FIG. 2), optical waveguides 104 and 106, and electrodes 108, 110, and 112. Light source 202 outputs a signal 204, typically unmodulated visible or infrared light, to optical splitter 206. Preferably, light source 202 is a laser device outputting substantially coherent light. Optical splitter 206 splits signal 204 into two similar signals 208A and 208B, which are each input to an optical waveguide. Signal 208A is input to waveguide 104 and signal 208B is input to waveguide 106. The application of similar signals 208A and 208B to parallel waveguides 104 and 106 results in the electrical fields of signals 208A and 208B in the parallel waveguides 104 and 106 being aligned in the same phase or direction. For example, arrows 212 represent the electrical fields of signals 208A and 208B at an instant in time. As shown, the electrical fields of signals 208A and 208B in the parallel waveguides 104 and 106 are aligned in the same phase or direction.

Modulation signal generator 210 outputs an electrical modulation signal 211 that is input to modulator 100. The output of generator 210 is connected to the center electrode 110 of modulator 100. Electrodes 108 and 112 are connected to a common or ground potential. The electrical fields resulting from the application of the modulation signal 211 to the center electrode, between electrodes connected to common, are aligned in opposite directions. That is, the electrical fields are 180 degrees out of phase. For example, arrows 214 represent the electrical fields resulting from the application of the modulation signal 211 to the center electrode. As shown, the electrical fields are 180 degrees out of phase.

The application of the electrical fields 214, which result from the application of the modulation signal 211, to the optical signals 208A and 208B in the electro-optically active crystalline structure modulates the optical signals to form modulated optical signals 216A and 216B. The modulated optical signals are combined in optical combiner 218 to from an output modulated signal 220. The application of out of phase electrical fields 214, which result from the application of the modulation signal 211, to the in phase optical signals 208A and 208B in the co-planar waveguides 104 and 106, which are formed in an electro-optically active crystalline structure, results in output modulation signal 220 having double the phase difference. This improves the modulation efficiency of modulator 100.

In a preferred embodiment, optical splitter 206, optical waveguides for signals 208A and 208B, optical combiner 218, and optical waveguides for signals 216A and 216B are formed in substrate 102 of FIG. 1, along with modulator 100. For example, splitter 206 may be formed in substrate 102 using unbleached chromophores having a higher index of refraction than the portion of the substrate used to form modulator 100. This integrated,. "on-chip" embodiment improves performance of the system and reduces manufacturing costs relative to a discrete implementation. However, the present invention contemplates not only integrated embodiments, but any and all discrete embodiments as well.

Figure 3:
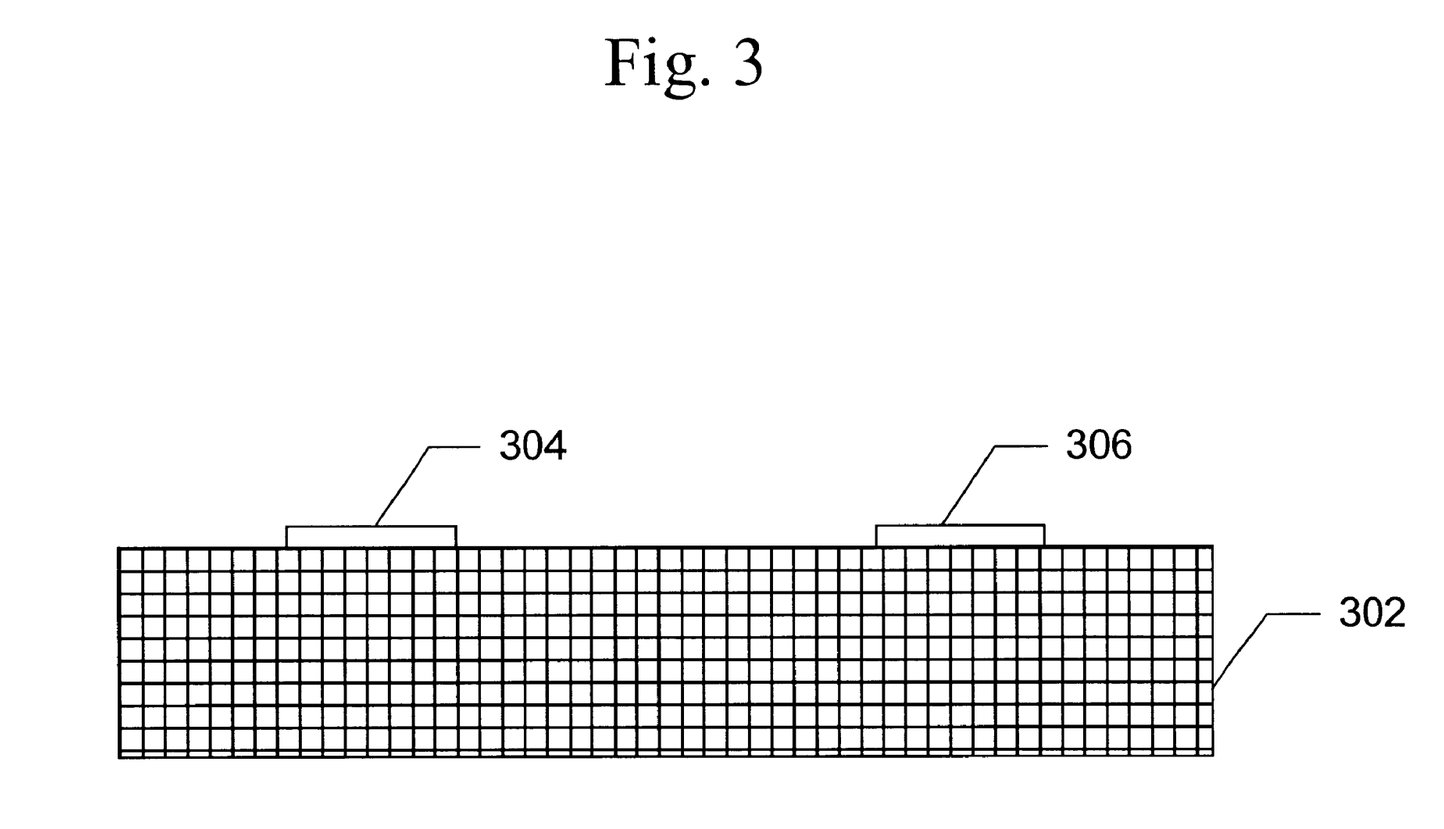
FIG. 3 shows a masking step of a process of producing the modulator shown in FIG. 1.

A co-planar traveling wave electro-optic modulator, such as that shown in FIG. 1, may be fabricated by any of several well-known processes, such as dopant diffusion, etching, or photobleaching. For example, a photobleaching process for fabricating a co-planar traveling wave electro-optic modulator, such as that shown in FIG. 1, is shown in FIGS. 3–5.

Photobleaching is a method used to change a material's properties through the use of light. Predetermined areas of the material are exposed to light at various wavelengths and strengths to change the material's properties, for example, to permanently change the index of refraction. As shown in FIG. 3, a substrate of material to be photobleached is provided. A plurality of masks, such as masks 304 and 306, are placed over the substrate 302 to allow selective photobleaching of predetermined areas of the material.

Figure 4:
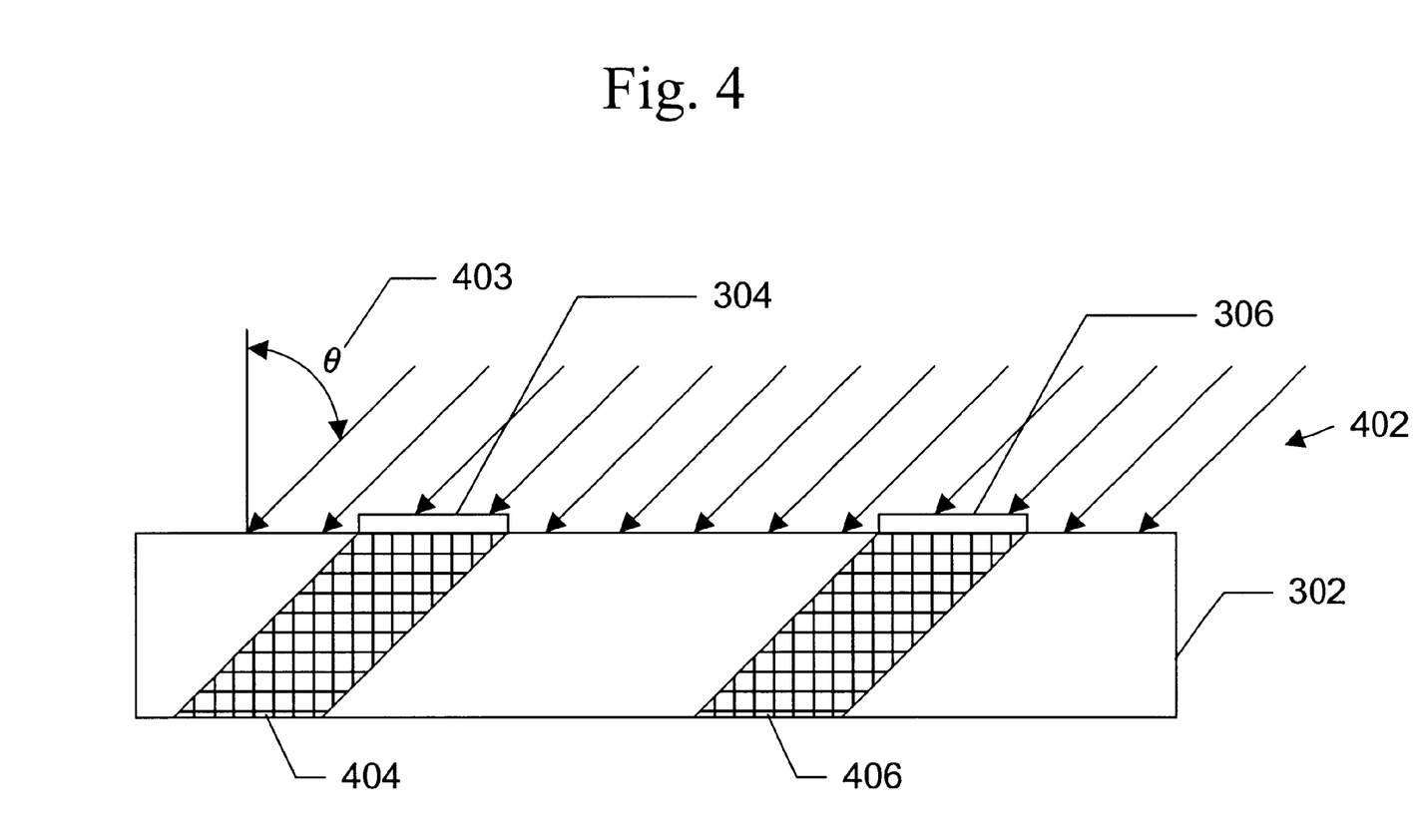
FIG. 4. shows a first photobleaching step of a process of producing the modulator show in FIG. 1.

As shown in FIG. 4, light 402 is applied to substrate 302 and masks 304 and 306 in order to photobleach the portions of the substrate that are not shielded by the masks. In general, the section of a substrate that is to surround the channel of the waveguide is photobleached to have a lower index of refraction than the channel itself. This condition allows light to travel down the waveguide (through the channel) without radiating out through the cladding material, as is well-known in the relevant arts. The light is applied at an angle 403, termed θ, which is measured from a perpendicular to the surface of substrate 302. The application of light at an angle causes diagonal channels 404 and 406 to be formed where the substrate is shielded by masks 304 and 306.

Figure 5:
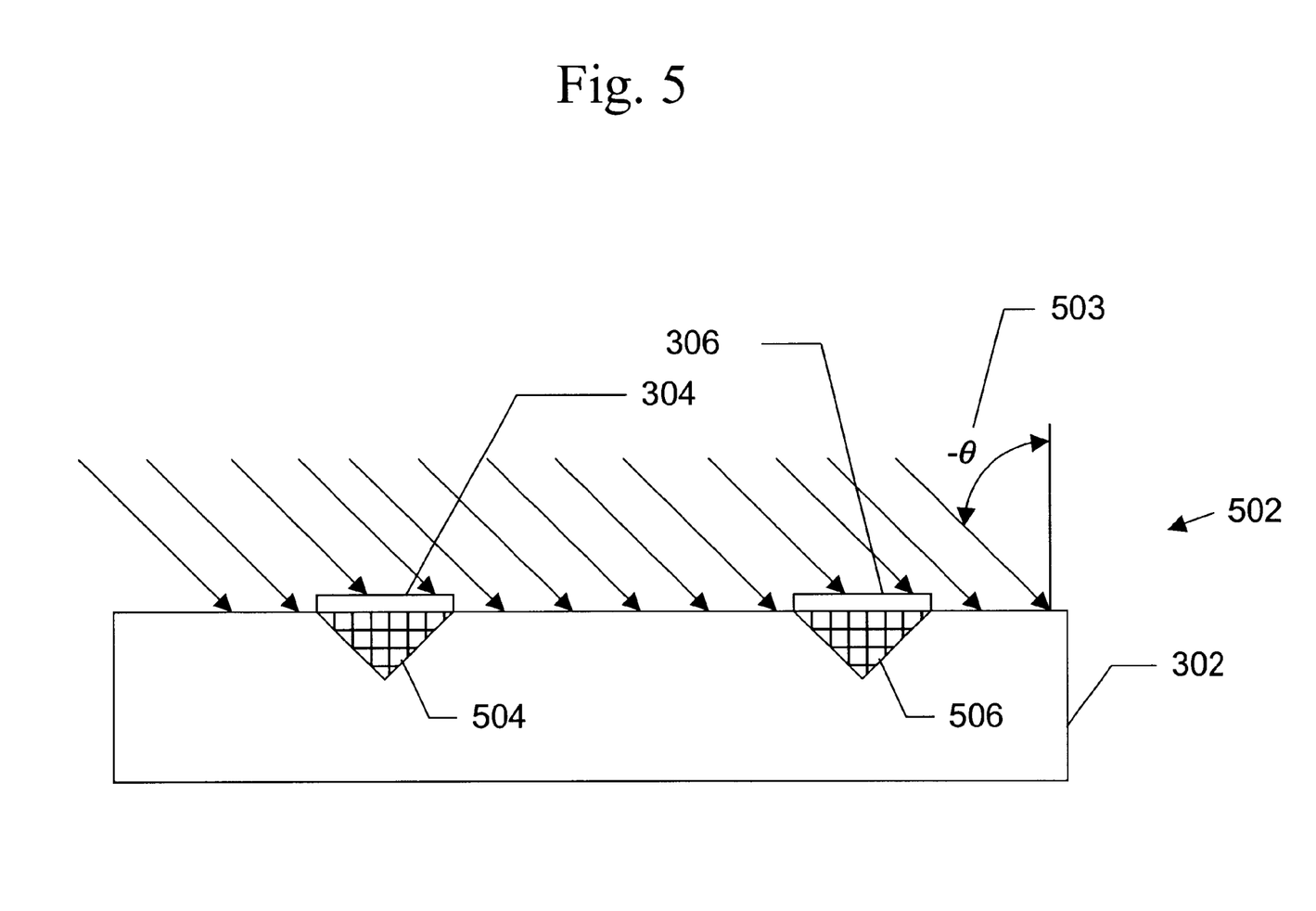
FIG. 5. shows a second photobleaching step of a process of producing the modulator shown in FIG. 1.

As shown in FIG. 5, light 502 is applied to substrate 302 and masks 304 and 306 in order to photobleach the portions of the substrate that are not shielded by the masks. The light is applied at an angle 503, which is termed −θ. Angle 503 of similar magnitude to angle 403, as measured from a perpendicular to the surface of substrate 302. However, angle 503 is opposite in direction to angle 403. The application of light at an angle opposite to that shown in FIG. 4 causes triangular channels 504 and 506 to be formed where the substrate is shielded by masks 304 and 306.

Figure 6:
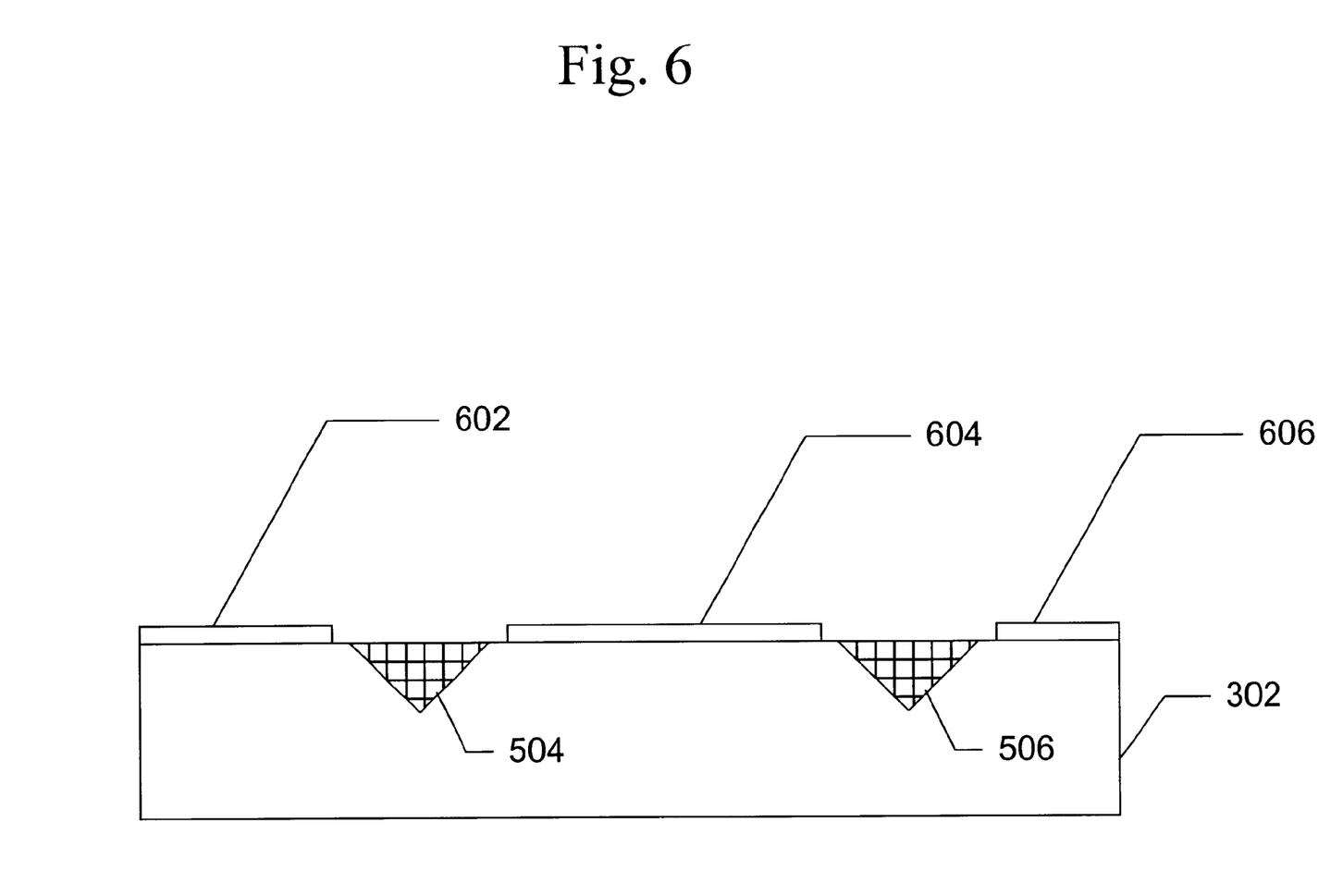
FIG. 6 shows an electrode-fabricating step of a process of producing the modulator shown in FIG. 1.

As shown in FIG. 6, masks 304 and 306 are removed and electrodes 602, 604, and 606 are fabricated on the surface of substrate 302.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An electro-optic modulator comprising:
    a substrate having a surface, the substrate formed from an organic crystalline material;
    a first optical waveguide and a second optical waveguide, the optical waveguides formed in the substrate and being co-planar, each waveguide having a first index of refraction, each waveguide operable to transmit a light signal, and the substrate having a second index of refraction;
    a first electrode disposed on the surface of the substrate between the first and second optical waveguides, the first electrode operable to receive a modulation signal; and
    a second electrode and a third electrode disposed on the surface of the substrate surrounding the first and second optical waveguides, the second and third electrodes connected to a common potential;
    whereby the light signal is modulated in accordance with the modulation signal.

2. The electro-optic modulator of claim 1, wherein the second index of refraction is lower than the first index of refraction.

3. The electro-optic modulator of claim 2, wherein the optical waveguides are formed by changing an index of refraction of the substrate from the first index of refraction to the second index of refraction by photobleaching of the substrate.

4. The electro-optic modulator of claim 2, wherein the optical waveguides are substantially aligned lengthwise with a crystalline axis of the substrate.

5. The electro-optic modulator of claim 1, wherein the light signal is a laser light signal.

6. An electro-optic modulator system comprising:
    a light source operable to output a light signal;
    a modulation signal generator operable to output a modulation signal; and
    an electro-optic modulator comprising:
    a substrate having a surface;
    a first optical waveguide and a second optical waveguide, the optical waveguides formed in the substrate and being co-planar, each waveguide having a first index of refraction, each waveguide coupled to the light signal, and the substrate having a second index of refraction, wherein the second index of refraction is lower than the first index of refraction, and wherein the optical waveguides are formed by changing an index of refraction of the substrate from the first index of refraction to the second index of refraction by photobleaching of the substrate;
    a first electrode disposed on the surface of the substrate between the first and second optical waveguides, the first electrode coupled to the modulation signal; and
    a second electrode and a third electrode disposed on the surface of the substrate surrounding the first and second optical waveguides, the second and third electrodes connected to a common potential;
    whereby the light signal is modulated in accordance with the modulation signal.

7. The system of claim 6, wherein the light source comprises a laser device.

8. The system of claim 7, further comprising an optical splitter coupled to the laser device, the optical splitter operable to output a first light signal and a second light signal, the light signals being similar.

9. The system of claim 8, wherein first optical waveguide is coupled to the first light signal and the second optical waveguide is coupled to the second light signal.

10. The system of claim 9, further comprising an optical combiner having a first input coupled to a first modulated light signal output from the first optical waveguide, a second input coupled to a second modulated light signal output from the second optical waveguide, and an output operable to output a combined modulated light signal.

11. The system of claim 6, wherein the optical waveguides are substantially aligned lengthwise with a crystalline axis of the substrate.

12. A method of producing an electro-optical modulator comprising the steps of:
    applying a first mask and a second mask to a substrate, the substrate having a first index of refraction;
    changing an index of refraction of a portion of the substrate that is not shielded by the masks to a second index of refraction by performing the steps of:
    exposing the substrate and masks to light at a first angle to a perpendicular from the substrate, whereby a portion of the substrate that is not shielded by the masks is photobleached by the light so as to change an index of refraction of the portion of the substrate that is not shielded by the masks; and
    exposing the substrate and masks to light at a second angle to a perpendicular from the substrate, the second angle of similar magnitude to the first angle and of opposite direction to the first angle, whereby a portion of the substrate that is not shielded by the masks is photobleached by the light so as to change an index of refraction of the portion of the substrate that is not shielded by the masks.

13. The method of claim 11, wherein the second index of refraction is lower than the first index of refraction.

14. The method of claim 11, further comprising the steps of:
   removing the first and second masks; and
   applying a first electrode to a surface of the substrate between the first and second optical waveguides; and
   applying a second electrode and a third electrode to the surface of the substrate surrounding the first and second optical waveguides.

15. The method of claim 11, wherein the optical waveguides are substantially aligned lengthwise with a crystalline axis of the substrate.

16. The method of claim 12, wherein the substrate is formed from a crystalline material.

17. The method of claim 13, wherein the substrate is formed from diethylaminosulfur trifluoride.

18. An electro-optic modulator comprising:
   a substrate having a surface, wherein the substrate is formed from diethylaminosulfur trifluoride;
   a first optical waveguide and a second optical waveguide, the optical waveguides formed in the substrate and being co-planar, each waveguide having a first index of refraction, each waveguide operable to transmit a light signal, and the substrate having a second index of refraction;
   a first electrode disposed on the surface of the substrate between the first and second optical waveguides, the first electrode operable to receive a modulation signal; and
   a second electrode and a third electrode disposed on the surface of the substrate surrounding the first and second optical waveguides, the second and third electrodes connected to a common potential;
   whereby the light signal is modulated in accordance with the modulation signal.

19. The electro-optic modulator of claim 18, wherein the second index of refraction is lower than the first index of refraction.

20. The electro-optic modulator of claim 18, wherein the optical waveguides are formed by changing an index of refraction of the substrate from the first index of refraction to the second index of refraction by photobleaching of the substrate.

21. The electro-optic modulator of claim 19, wherein the optical waveguides are substantially aligned lengthwise with a crystalline axis of the substrate.

22. The electro-optic modulator of claim 18, wherein the light signal is a laser light signal.

23. An electro-optic modulator system comprising:
   a light source operable to output a light signal;
   a modulation signal generator operable to output a modulation signal; and
   an electro-optic modulator comprising:
      a substrate having a surface, wherein the substrate is formed from an organic crystalline material;
      a first optical waveguide and a second optical waveguide, the optical waveguides formed in the substrate and being co-planar, each waveguide having a first index of refraction, each waveguide coupled to the light signal, and the substrate having a second index of refraction;
      a first electrode disposed on the surface of the substrate between the first and second optical waveguides, the first electrode coupled to the modulation signal; and
      a second electrode and a third electrode disposed on the surface of the substrate surrounding the first and second optical waveguides, the second and third electrodes connected to a common potential;
      whereby the light signal is modulated in accordance with the modulation signal.

24. The system of claim 23, wherein the light source comprises a laser device.

25. The system of claim 24, further comprising an optical splitter coupled to the laser device, the optical splitter operable to output a first light signal and a second light signal, the light signals being similar.

26. The system of claim 25, wherein first optical waveguide is coupled to the first light signal and the second optical waveguide is coupled to the second light signal.

27. The system of claim 26, further comprising an optical combiner having a first input coupled to a first modulated light signal output from the first optical waveguide, a second input coupled to a second modulated light signal output from the second optical waveguide, and an output operable to output a combined modulated light signal.

28. The system of claim 6, wherein the optical waveguides are substantially aligned lengthwise with a crystalline axis of the substrate.

29. An electro-optic modulator system comprising:
   a light source operable to output a light signal;
   a modulation signal generator operable to output a modulation signal; and
   an electro-optic modulator comprising:
      a substrate having a surface, wherein the substrate is formed from diethylaminosulfur trifluoride;
      a first optical waveguide and a second optical waveguide, the optical waveguides formed in the substrate and being co-planar, each waveguide having a first index of refraction, each waveguide coupled to the light signal, and the substrate having a second index of refraction;
      a first electrode disposed on the surface of the substrate between the first and second optical waveguides, the first electrode coupled to the modulation signal; and
      a second electrode and a third electrode disposed on the surface of the substrate surrounding the first and second optical waveguides, the second and third electrodes connected to a common potential;
      whereby the light signal is modulated in accordance with the modulation signal.

30. The system of claim 29, wherein the light source comprises a laser device.

31. The system of claim 30, further comprising an optical splitter coupled to the laser device, the optical splitter operable to output a first light signal and a second light signal, the light signals being similar.

32. The system of claim 31, wherein first optical waveguide is coupled to the first light signal and the second optical waveguide is coupled to the second light signal.

33. The system of claim 32, further comprising an optical combiner having a first input coupled to a first modulated light signal output from the first optical waveguide, a second input coupled to a second modulated light signal output from the second optical waveguide, and an output operable to output a combined modulated light signal.

34. The system of claim 29, wherein the optical waveguides are substantially aligned lengthwise with a crystalline axis of the substrate.

35. A an electro-optical modulator produced by performing the steps of:
   applying a first mask and a second mask to a substrate, the substrate having a first index of refraction;

changing an index of refraction of a portion of the substrate that is not shielded by the masks to a second index of refraction by performing the steps of:

exposing the substrate and masks to light at a first angle to a perpendicular from the substrate, whereby a portion of the substrate that is not shielded by the masks is photobleached by the light so as to change an index of refraction of the portion of the substrate that is not shielded by the masks; and exposing the substrate and masks to light at a second angle to a perpendicular from the substrate, the second angle of similar magnitude to the first angle and of opposite direction to the first angle, whereby a portion of the substrate that is not shielded by the masks is photobleached by the light so as to change an index of refraction of the portion of the substrate that is not shielded by the masks.

36. The electro-optical modulator of claim 35, wherein the second index of refraction is lower than the first index of refraction.

37. The electro-optical modulator of claim 36, further comprising the steps of:

removing the first and second masks; and applying a first electrode to a surface of the substrate between the first and second optical waveguides; and applying a second electrode and a third electrode to the surface of the substrate surrounding the first and second optical waveguides.

38. The electro-optical modulator of claim 37, wherein the optical waveguides are substantially aligned lengthwise with a crystalline axis of the substrate.

39. The electro-optical modulator of claim 38, wherein the substrate is formed from a crystalline material.

40. The electro-optical modulator of claim 39, wherein the substrate is formed from diethylaminosulfur trifluoride.

* * * * *